(12) United States Patent
Marubayashi et al.

(10) Patent No.: US 12,482,894 B2
(45) Date of Patent: Nov. 25, 2025

(54) SEALING PLATE EQUIPPED WITH GAS DISCHARGE VALVE AND SECONDARY BATTERY USING THE SAME

(71) Applicants: Prime Planet Energy & Solutions, Inc., Tokyo (JP); FUJI SPRINGS Co., Inc., Hyogo (JP)

(72) Inventors: Hironori Marubayashi, Sumoto (JP); Ryoichi Wakimoto, Kobe (JP); Akihiro Yoneyama, Kobe (JP); Akira Fujii, Asago (JP); Toshihiro Odagaki, Asago (JP); Katsuhisa Kawai, Asago (JP)

(73) Assignees: PRIME PLANET ENERGY & SOLUTIONS, INC., Tokyo (JP); FUJI SPRINGS CO., INC., Hyogo (JP)

( * ) Notice: Subject to any disclaimer, the term of this patent is extended or adjusted under 35 U.S.C. 154(b) by 660 days.

(21) Appl. No.: 17/703,990

(22) Filed: Mar. 25, 2022

(65) Prior Publication Data
US 2022/0320675 A1 Oct. 6, 2022

(30) Foreign Application Priority Data
Mar. 31, 2021 (JP) .................. 2021-060890

(51) Int. Cl.
*H01M 50/342* (2021.01)

(52) U.S. Cl.
CPC .... *H01M 50/3425* (2021.01); *H01M 2200/20* (2013.01)

(58) Field of Classification Search
None
See application file for complete search history.

(56) References Cited

U.S. PATENT DOCUMENTS

2007/0059586 A1* 3/2007 Matsumoto ....... H01M 50/3425
429/82
2014/0017524 A1* 1/2014 Ootsuka ............... B21D 51/383
72/352
(Continued)

FOREIGN PATENT DOCUMENTS

CN 104659290 A 5/2015
JP H11224659 A * 8/1999
(Continued)

OTHER PUBLICATIONS

Machine English translation of Abe (JP-H11224659-A) (Year: 1999).*

*Primary Examiner* — Jeffrey T Barton
*Assistant Examiner* — Karen J. Armstrong
(74) *Attorney, Agent, or Firm* — HAUPTMAN HAM, LLP

(57) ABSTRACT

According to the present disclosure, there is provided a sealing plate equipped with a gas discharge valve that reduces processing load and work hardening during molding. A gas discharge valve of a sealing plate 1 disclosed herein has a flat plate-shaped base portion and a protruding portion protruding from a first surface of the base portion in a first direction, an annular thin-walled portion having a thickness smaller than the thickness of the protruding portion is provided around the protruding portion, and a first surface of the thin-walled portion is substantially on the same surface as the first surface of the base portion. In the gas discharge valve having the above configuration, the total amount of metal that is plastically deformed is reduced by limiting the formation region of the thin-walled portion to the periphery of the protruding portion.

18 Claims, 8 Drawing Sheets

(56) References Cited

U.S. PATENT DOCUMENTS

| | | | |
|---|---|---|---|
| 2014/0141293 A1* | 5/2014 | Urano | H01M 50/103 |
| | | | 429/56 |
| 2015/0140372 A1 | 5/2015 | Kondo | |
| 2019/0237729 A1* | 8/2019 | Lee | H01M 50/30 |
| 2023/0048535 A1 | 2/2023 | Fujii et al. | |

FOREIGN PATENT DOCUMENTS

| | | |
|---|---|---|
| JP | 200021380 A | 1/2000 |
| JP | 2001-102023 A | 4/2001 |
| JP | 2006236949 A | 9/2006 |
| JP | 2008-159313 A | 7/2008 |
| JP | 2012182008 A | 9/2012 |
| JP | 2012252809 A | 12/2012 |
| JP | 2013-151024 A | 8/2013 |
| JP | 2014-102935 A | 6/2014 |
| JP | 2015-99747 A | 5/2015 |
| JP | 2022-7852 A | 1/2022 |
| WO | 2021187089 A1 | 9/2021 |

* cited by examiner

SEALING PLATE EQUIPPED WITH GAS DISCHARGE VALVE AND SECONDARY BATTERY USING THE SAME

CROSS REFERENCE TO RELATED APPLICATIONS

This application claims priority based on Japanese Patent Application No. 2021-060890 filed on Mar. 31, 2021, and the entire contents of the application are incorporated herein by reference.

BACKGROUND

1. Technical Field

The present disclosure relates to a sealing plate equipped with a gas discharge valve and a secondary battery using the same.

2. Description of the Related Art

A secondary battery such as a lithium ion secondary battery includes, for example, an electrode body and a battery case that accommodates the electrode body. The battery case includes an exterior body that is a container having an opening on one side, and a sealing plate that closes the opening of the exterior body. In this type of secondary battery, a gas discharge valve may be provided in the battery case (typically, a sealing plate) to improve safety. This gas discharge valve is a secondary battery component including a valve designed to open at a predetermined pressure and discharge the gas contained in the battery case when a large amount of gas is suddenly generated in the battery case. For example, an angular storage battery described in JP-A-2012-252809 has a lid member (sealing plate) in which a base portion forming an upper surface, a peripheral wall portion forming a recess dented from the base portion, and a safety valve (gas discharge valve) supported by being connected to the inner peripheral surface of the peripheral wall portion are integrally formed. In JP-A-2012-252809, an aluminum flat plate is pressed to form the recess, and a thin-film-shaped safety valve is formed at the bottom of the recess.

SUMMARY

However, according to the study conducted by the present inventor, it can be considered that there is room for improvement in the abovementioned technique. That is, in the gas discharge valve having the abovementioned configuration, the flat plate is pressed to form the recess in which the bottom surface serves as a thin-film portion. In the molding of such a thin-film portion, a large amount of metal is plastically deformed and the processing load is very large. The resulting problem is that mass production stability is likely to be lowered due to molding defects. Further, since the thin-film portion formed by plastically deforming a large amount of metal is subjected to a large work hardening, the thin-film portion may not be broken at a predetermined internal pressure. Therefore, in the conventional gas discharge valve, it is necessary to design the dimensions of each part so as to operate (open) at a desired pressure in consideration of the degree of work hardening after molding, so that the degree of freedom of design is very limited.

The technique disclosed herein was created in view of the above circumstances, and it is an object thereof to provide a sealing plate equipped with a gas discharge valve that reduces processing load and work hardening during molding and excels in mass production stability and freedom of design and also to provide a secondary battery.

In order to achieve the above object, the technique disclosed herein provides a sealing plate having the following configuration.

The sealing plate disclosed herein is a sealing plate for a secondary battery equipped with a gas discharge valve. The gas discharge valve of the sealing plate has a flat plate-shaped base portion and a protruding portion protruding from a first surface of the base portion in a first direction. In such a gas discharge valve, an annular thin-walled portion having a thickness smaller than the thickness of the protruding portion is provided around the protruding portion, and a first surface of the thin-walled portion is substantially on the same surface as the first surface of the base portion. The "first surface" is a surface facing an electrode body in a battery case when the sealing plate is attached to a secondary battery. Further, the "first direction" is a direction toward the electrode body. Meanwhile, the "second surface" is a surface exposed to the outside of the battery case when it is provided in the secondary battery. The "second direction" is a direction toward the outside of the battery case.

In the gas discharge valve of the sealing plate disclosed herein, the formation region of the thin-walled portion where a large amount of metal needs to be plastically deformed is limited to the periphery of the protruding portion. This makes it possible to reduce the total amount of metal that is plastically deformed during molding. Further, this annular thin-walled portion is provided around the protruding portion. Therefore, the metal crushed to mold the thin-walled portion can be released to the protruding portion. As a result, the processing load during molding of the gas discharge valve can be greatly reduced, so that the occurrence of molding defects can be suppressed and mass production stability can be improved. Further, as described hereinabove, the sealing plate disclosed herein has a small total amount of metal that is plastically deformed during molding of the gas discharge valve. Therefore, work hardening of the thin-walled portion after molding can be reduced. As a result, it becomes easy to break the thin-walled portion (operate the gas discharge valve) at a desired pressure, which can contribute to the improvement of the degree of freedom of designing the gas discharge valve.

Further, in a preferred embodiment of the sealing plate disclosed herein, the thickness of the protruding portion is equal to or less than the thickness of the base portion. In the technique disclosed here, when the protruding portion is formed thicker than the thin-walled portion, the processing load and work hardening during molding can be sufficiently suppressed. That is, the thickness of the protruding portion is not particularly limited and may be smaller than that of the base portion. The ratio of the thickness of the protruding portion to the thickness of the base portion is preferably 50% to 100%. By forming the protruding portion having a thickness of a certain value or more with respect to the base portion in this way, the amount of plastic deformation during molding can be reduced and the processing load can be more preferably reduced.

In a preferred embodiment of the sealing plate disclosed herein, the first surface of the protruding portion is curved so that a center protrudes in the first direction. As a result, plastic deformation occurs such that the metal gathers toward the center of the first surface of the curved protruding portion, so that it becomes easier to release the metal crushed for molding the thin-walled portion to the protruding portion. As a result, the processing load during molding can be more advantageously reduced and mass production stability can be improved.

In a preferred embodiment of the sealing plate disclosed herein, the thin-walled portion is provided with a substantially annular first groove portion that surrounds the protruding portion. Since the first groove portion serves as a starting point at which the thin-walled portion breaks when a large amount of gas is suddenly generated, it can contribute to the improvement of the operational stability of the gas discharge valve.

In the embodiment in which the first groove portion is provided, it is preferable that the first groove portion be formed on the surface (second surface) opposite to the first surface of the thin-walled portion. By forming the first groove portion on the second surface opposite to the positive pressure side (first surface side), the thin-walled portion breaks so that the first groove portion expands when a large amount of gas is suddenly generated and the first surface side of the thin-walled portion is pressurized, whereby the operational stability of the gas discharge valve is further improved.

In the embodiment in which the first groove portion is provided, the ratio of the depth of the first groove portion to the thickness of the thin-walled portion is preferably 10% to 50%. As a result, the operational stability of the gas discharge valve can be advantageously improved while preventing the mass production stability from being lowered due to the thin-walled portion being damaged during molding of the first groove portion.

In a preferred embodiment of the sealing plate disclosed herein, the ratio of the thickness of the thin-walled portion to the thickness of the base portion is 5% to 20%. This makes it possible to construct a gas discharge valve in which the thin-walled portion breaks and opens at a desired pressure.

In a preferred embodiment of the sealing plate disclosed herein, the shape of the protruding portion in plan view is a substantially perfect circular shape in which the ratio of a major axis to a minor axis is 90% or more. As a result, the metal crushed during molding of the thin-walled portion can be uniformly released toward the substantially perfect circular protruding portion present radially on the inner side of the thin-walled portion, so that the processing load can be further advantageously reduced.

In a preferred embodiment of the sealing plate disclosed herein, a second groove portion having a linear shape in plan view is formed on the first surface of the protruding portion. For this reason, when a large amount of gas is suddenly generated, the protruding portion is bent starting from the linear second groove portion. As a result, a large stress can be concentrated on the thin-walled portion, so that the operational stability of the gas discharge valve can be improved.

Further, in a preferred embodiment of the sealing plate disclosed herein, the shape of the protruding portion in plan view is a circular shape in which the ratio of a major axis to a minor axis is 90% or more, and the ratio of the length of the second groove portion to the outer diameter of the protruding portion is 70% to 90%. As a result, it becomes easy to bend the protruding portion when the internal pressure suddenly rises, and it is possible to suppress an increase in the processing load due to the formation of the second groove portion.

In a preferred embodiment of the sealing plate disclosed herein, a depth of a central portion of the second groove portion in the length direction of the second groove portion is larger than a depth of both end portions. As a result, it is possible to further suppress an increase in the processing load due to the formation of the second groove portion.

In a preferred embodiment of the sealing plate disclosed herein, the thin-walled portion and the second surface of the protruding portion are provided with a recess dented from the second surface of the base portion, and a peripheral wall of the recess is provided with a tapered portion. When the gas discharge valve is opened, the protruding portion connected to the base portion via a part of the thin-walled portion may stay in the space in the second direction of the opening, and may hinder the escape of gas from the inside of the battery case. By contrast, according to the present embodiment, since the range of motion of the protruding portion when the gas discharge valve is opened can be sufficiently ensured, the protruding portion can be prevented from coming into contact with the peripheral wall of the recess and staying in a space in the second direction of the opening.

In a preferred embodiment of the sealing plate disclosed herein, an annular step is provided on the bottom surface of the recess, and a region outside the annular step is higher than an inner region. As a result, the thickness at the boundary between the thin-walled portion and the protruding portion can be ensured to some extent, so that the thin-walled portion can be prevented from breaking during molding.

In a preferred embodiment of the sealing plate disclosed herein, the annular step is provided on the second surface of the protruding portion on the inner side of the thin-walled portion. As a result, the thickness at the boundary between the thin-walled portion and the protruding portion can be more advantageously ensured, so that the thin-walled portion can be advantageously prevented from breaking during molding.

In a preferred embodiment of the sealing plate disclosed herein, the ratio of the outer diameter of the thin-walled portion in the lateral direction of the sealing plate to the length of the sealing plate in the lateral direction of the sealing plate is 30% to 70%. When a large amount of gas is suddenly generated and the rectangular sealing plate is deformed while the secondary battery is restrained along the lateral direction as in the case of mounting on a vehicle, the sealing plate bends so that a ridgeline along the lateral direction of the sealing plate is formed. At this time, where a thin-walled portion having an outer diameter of a predetermined length is formed in the lateral direction of the sealing plate, a large stress can be concentrated near both ends of the thin-walled portion in the lateral direction of the sealing plate. Therefore, the operational stability can be further improved.

In a preferred embodiment of the sealing plate disclosed herein, a second groove portion having a linear shape in plan view is formed on the first surface of the protruding portion, and the second groove extends along the lateral direction of the sealing plate. As a result, the protruding portion along the second groove is likely to be deformed, so that the operational stability of the gas discharge valve can be further improved.

Further, a secondary battery is provided as another aspect of the technique disclosed herein. The secondary battery disclosed herein includes an electrode body including a positive electrode and a negative electrode body, and a battery case that accommodates the electrode body. The battery case of such a secondary battery includes an exterior body having an opening on one surface, and a sealing plate that closes the opening of the exterior body. The sealing plate is a sealing plate having the above-described configuration, and is arranged so that the protruding portion of the gas discharge valve protrudes toward the electrode body.

Since the sealing plate having the above configuration is equipped with a gas discharge valve having excellent mass production stability and freedom of design, a highly reliable secondary battery in which when a large amount of gas is suddenly generated, the gas can be stably discharged can be easily designed and mass-produced.

DETAILED DESCRIPTION

Figure 1:
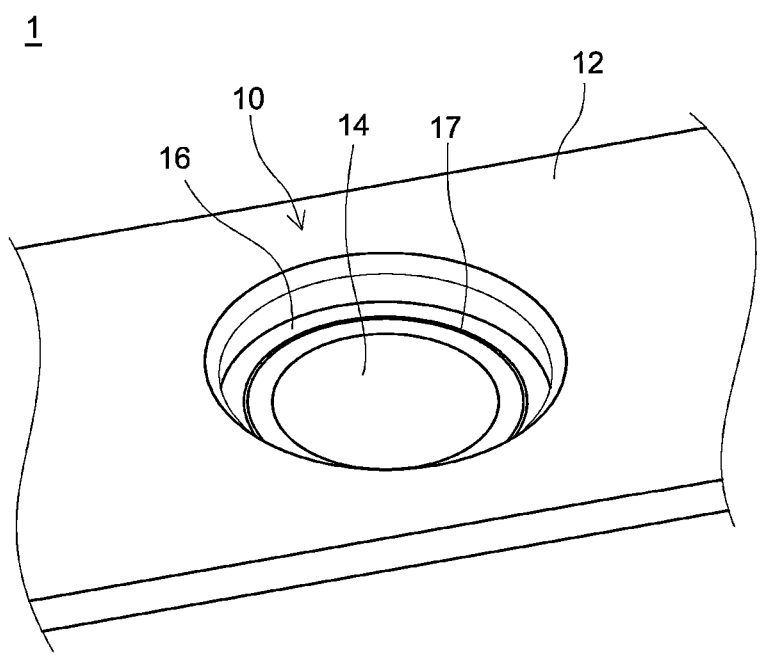
FIG. 1 is a perspective view schematically showing a sealing plate according to an embodiment.

Hereinafter, some preferred embodiments of the technique disclosed herein will be described with reference to the drawings. It should be noted that matters other than those specifically mentioned in the present description and necessary for carrying out the technique disclosed herein (for example, materials for electrodes and electrolytes) can be ascertained as design matters for a person skilled based on the related art in the pertinent field. That is, the technique disclosed herein can be implemented based on the contents disclosed in the present description and the general technical knowledge in the field.

In the drawings referred to in the following description, the same reference numerals are given to the members/parts that perform the same action. Furthermore, the dimensional relationships (length, width, thickness, etc.) in each drawing do not reflect the actual dimensional relationships. It is assumed that the reference symbol X in each figure indicates the "width direction", the reference symbol Y indicates the "depth direction", and the reference symbol Z indicates the "height direction". However, these directions are defined for convenience of explanation, and are not intended to limit the arrangement mode of the secondary battery during use or manufacture. Further, in the present description, the notation of "A to B" indicating a numerical range is inclusive of the meanings of "A or more and B or less", as well as "preferably larger than A" and "preferably smaller than B".

Sealing Plate

Figure 2:
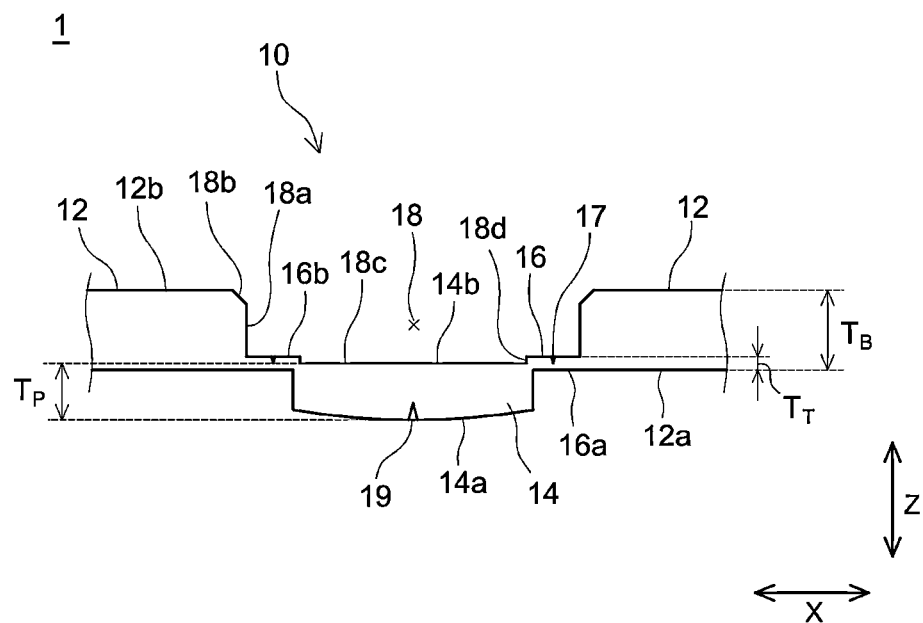
FIG. 2 is a cross-sectional view schematically showing the sealing plate according to the embodiment.
Figure 3:
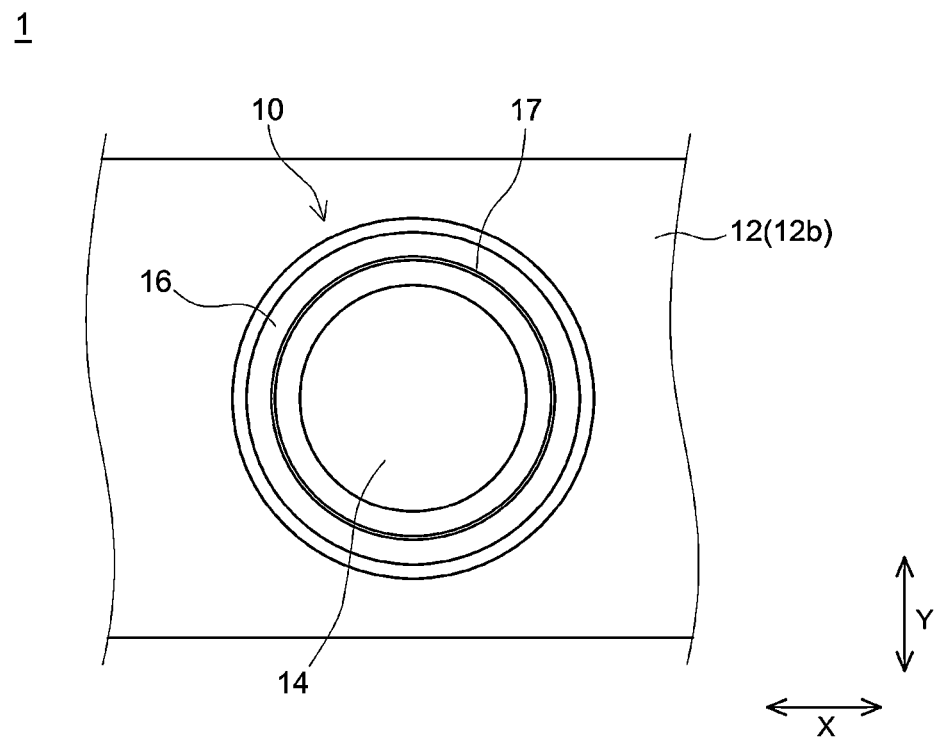
FIG. 3 is a plan view schematically showing a second surface in the vicinity of the gas discharge valve of the sealing plate according to the embodiment.
Figure 4:
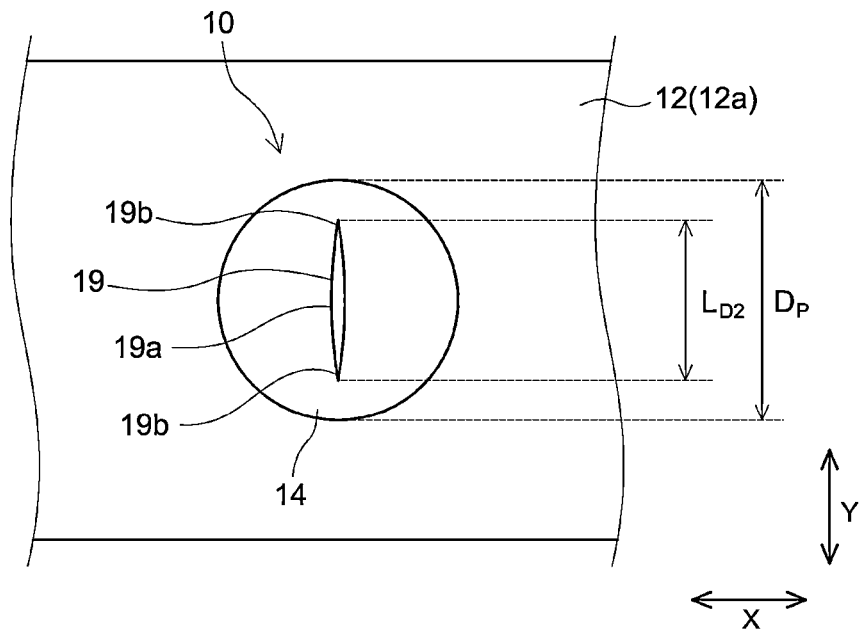
FIG. 4 is a plan view schematically showing a first surface in the vicinity of the gas discharge valve of the sealing plate according to the embodiment.

Hereinafter, an embodiment of the sealing plate disclosed here will be described with reference to FIGS. 1 to 4. FIG. 1 is a perspective view schematically showing a sealing plate according to the present embodiment. FIG. 2 is a cross-sectional view schematically showing the sealing plate according to the present embodiment. FIG. 3 is a plan view schematically showing a second surface in the vicinity of a gas discharge valve of the sealing plate according to the present embodiment. FIG. 4 is a plan view schematically showing a first surface in the vicinity of the gas discharge valve of the sealing plate according to the present embodiment. As mentioned hereinabove, in the present description, the direction toward an electrode body in a battery case is referred to as a "first direction". Further, the direction toward the outside of the battery case is referred to as a "second direction". Here, the "first direction" indicates downward in the height direction Z in FIG. 2. Meanwhile, the "second direction" indicates upward in the height direction Z in FIG. 2.

A sealing plate 1 according to the present embodiment is a component of a secondary battery (secondary battery component) that forms one of the side walls of the battery case of the secondary battery. In the present description, the term "secondary battery" refers to a general power storage device capable of repeatedly charging and discharging, and is a concept inclusive of a so-called storage battery (chemical battery) such as a lithium ion secondary battery or a nickel hydrogen battery, and a capacitor (physical battery) such as an electric double layer capacitor. That is, the sealing plate according to the present embodiment is not limited to a specific type of secondary battery, and can be used without particular limitation for all secondary batteries in which gas may be generated when a problem such as overcharging occurs.

The sealing plate 1 according to the present embodiment is a plate-shaped member having a rectangular planar shape. A material having a predetermined strength can be used without particular limitation for the sealing plate 1. Examples of the material of the sealing plate 1 include a metal material containing aluminum as a main component, a metal material containing iron as a main component, and the like. As an example, from the viewpoint of weight, strength, and the like, it is preferable that the sealing plate 1 be made of a metal material containing aluminum as a main component. The "metal material containing aluminum as a main component" in the present description is a metal material containing 90% by weight or more of aluminum with respect to the total weight, and is inclusive of, for example, aluminum, an aluminum alloy, and the like.

As shown in FIGS. 1 to 3, the sealing plate 1 according to the present embodiment is equipped with a gas discharge valve 10. The gas discharge valve 10 has a flat plate-shaped base portion 12 and a protruding portion 14 protruding in the first direction (that is, downward in the height direction Z in FIG. 2) from a first surface (that is, the lower surface in FIG. 2) 12a of the base portion 12. An annular thin-walled portion 16 having a thickness smaller than the thickness of the protruding portion 14 is provided around the protruding portion 14, and a first surface 16a of the thin-walled portion 16 is formed to be on a substantially the same surface as the first surface 12a of the base portion 12. As will be described in detail hereinbelow, the sealing plate 1 having such a configuration has a small amount of plastic deformation of the metal when the thin-walled portion 16 of the gas discharge valve 10 is molded, and the metal crushed during molding of the thin-walled portion 16 can be released to the protruding portion 14. As a result, the processing load during press working is significantly reduced, so that mass production stability can be improved. Further, since the total amount of metal that is plastically deformed during molding is small and work hardening of the thin-walled portion 16 after molding is reduced, the thin-walled portion 16 can be easily broken (the gas discharge valve 10 can be easily operated) by a desired pressure. As a result, a contribution can also be made to improving the degree of freedom of designing the thickness of the thin-walled portion 16. Hereinafter, a specific configuration of the gas discharge valve 10 provided on the sealing plate 1 according to the present embodiment will be described.

(1) Base Portion

The base portion 12 is a region molded into a plate shape. The gas discharge valve 10 in the present embodiment is molded by pressing a flat plate-shaped metal member. At this time, a region where the protruding portion 14 and the thin-walled portion 16 are not formed becomes the base portion 12. Further, the base portion 12 serves as a connecting portion between the gas discharge valve 10 and other regions of the sealing plate 1. Specifically, in the present embodiment, the sealing plate 1 in which the base portion 12 of the gas discharge valve 10 and other regions of the sealing plate 1 are seamlessly integrated is molded by directly pressing the sealing plate 1. As a result, it is possible to reliably prevent an electrolytic solution from leaking from the joint portion of the gas discharge valve. Further, since the step of joining the gas discharge valve 10 to the sealing plate 1 can be omitted, it can contribute to the improvement of work efficiency. However, the technique disclosed herein is not limited to the mode in which the base portion of the gas discharge valve and the sealing plate are integrated. That is, the base portion of the separately molded gas discharge valve may be joined to another region of the sealing plate. In this case, an opening may be provided in the sealing plate, the gas discharge valve may be fitted into the opening, and then the base of the gas discharge valve and the sealing plate may be welded to each other. Such a mode in which the gas discharge valve is separately molded has an advantage that the molding of the gas discharge valve becomes relatively easy. In addition, there is an advantage that the gas discharge valve after molding can be easily sold and distributed.

The thickness $T_B$ of the base portion 12 can be 1 mm to 10 mm, and can be 1 mm to 5 mm. As the thickness $T_B$ of the base portion 12 increases, the durability of the base portion 12 against a sudden increase in the internal pressure of the case tends to improve. Meanwhile, as the thickness $T_B$ of the base portion 12 decreases, the processing load in molding the protruding portion 14 and the thin-walled portion 16 tends to decrease. However, the thickness $T_B$ of the base portion 12 is not particularly limited, and can be adjusted, as appropriate, in consideration of the thickness of the sealing plate 1 and the like.

(2) Protruding Portion

As shown in FIG. 2, the protruding portion 14 protrudes from the first surface 12a of the base portion 12 in the first direction. As will be described in detail hereinbelow, the thickness $T_P$ of the protruding portion 14 is larger than the thickness $T_T$ of the thin-walled portion 16. By performing the press working so as to mold such protruding portion 14, the total amount of metal that is plastically deformed is reduced as compared with the conventional technique in which the entire bottom surface of the recess is formed into a thin-film portion. Further, by forming the thin-walled portion 16 around the protruding portion 14, the metal obtained by crushing the thin-walled portion 16 can be released to the protruding portion 14. As a result, the processing load during press working can be greatly reduced, and the mass production stability of the gas discharge valve 10 can be improved. Further, in the present embodiment, the protruding portion 14 thicker than the thin-walled portion 16 protrudes in the first direction (toward the electrode body side when attached to the secondary battery). As a result, when a large amount of gas is suddenly generated, stress is concentrated on the thin-walled portion 16, which can contribute to the improvement of the operational stability of the gas discharge valve 10.

As shown in FIGS. 1 and 3, here, the shape of the protruding portion 14 in plan view is a substantially perfect circular shape. That is, the protruding portion 14 of a substantially circular shape is formed on the radially inner side of the thin-walled portion 16 having an annular shape in plan view. As a result, the metal crushed during molding of the thin-walled portion 16 can be uniformly released inward in the radial direction, so that the processing load during molding can be reduced more advantageously. The "substantially perfect circular shape" in the present description means a circular shape in which the ratio of the major axis to the minor axis is 90% or more (preferably 95% or more, and more preferably 98% or more).

Further, the thickness $T_P$ of the protruding portion 14 is not particularly limited as long as it is larger than the thickness $T_T$ of the thin-walled portion 16. For example, the ratio ($T_T/T_P$) of the thickness $T_T$ of the thin-walled portion to the thickness $T_P$ of the protruding portion 14 may be 1% to 50% or 5% to 40%. By forming the protruding portion 14 having a sufficient thickness with respect to the thin-walled portion 16, the metal crushed during molding of the thin-walled portion 16 can be advantageously released to the protruding portion 14, and the processing load during molding can be more advantageously reduced.

Further, the thickness $T_P$ of the protruding portion 14 may be equal to or less than the thickness $T_B$ of the base portion 12. In other words, the protruding portion 14 may be press-processed so as to be thinner than the base portion 12. Even in such a case, the processing load and work hardening during press working can be sufficiently reduced. From the viewpoint of reducing the amount of plastic deformation during molding so as to more advantageously reduce the processing load, the ratio ($T_P/T_B$) of the thickness $T_P$ of the protruding portion 14 to the thickness $T_B$ of the base portion 12 is preferably 50% or more, more preferably 60% or more, and particularly preferably 70% or more. Meanwhile, the upper limit of the $T_P/T_B$ is not particularly limited, and the base portion 12 and the protruding portion 14 may have the same thickness ($T_P/T_B$=100%). Further, the base portion 12 may be pressed in the press working to make the thickness $T_B$ of the base portion 12 smaller than the thickness $T_P$ of the protruding portion 14. Further, as a result of metal being released from the thin-walled portion 16 to the protruding portion 14 during molding, the protruding portion 14 may be thicker than the base portion 12. Therefore, the upper limit of the $T_P/T_B$ is not limited to 100% or less, and may be 120% or less, or 110% or less.

As shown in FIG. 2, the first surface 14a of the protruding portion 14 is curved so that the central portion in the radial direction protrudes in the first direction. As a result, when the protruding portion 14 is molded, plastic deformation occurs so that the metal gathers toward the center of the first surface 14a of the protruding portion 14, so that it becomes easy to release the metal from the thin-walled portion 16 to the protruding portion 14. Further, by molding the protruding portion 14 having such a shape, the stress applied from the gas generated inside the case can be concentrated on the thin-walled portion 16, which can contribute to the improvement of the operational stability of the gas discharge valve 10.

As shown in FIG. 4, in the present embodiment, a second groove portion 19 having a linear planar shape is formed on the first surface 14a of the protruding portion 14. As a result, when a large amount of gas is suddenly generated, the protruding portion 14 is bent starting from the linear second groove portion 19, and a large stress can be applied to the thin-walled portion 16. As a result, the thin-walled portion 16 can be broken more easily. As shown in FIG. 4, in the present embodiment, one second groove portion 19 is formed so that the planar shape passes through the center of the substantially perfect circular protruding portion 14. However, the number and formation positions of the second groove portions are not limited to the form shown in FIG. 4. For example, two second grooves that intersect at the center of a substantially perfect circular protruding portion may be formed. Further, a plurality of second groove portions may be formed substantially in parallel. In these cases, when the internal pressure of the case suddenly rises, the protruding portion also bends starting from the second groove portion, so that a large stress can be applied to the thin-walled portion. Further, it is preferable that the linear second groove portion 19 be formed so as to extend along the lateral direction (depth direction Y in FIG. 4) of the substantially rectangular sealing plate 1. As a result, the protruding portion 14 is easily bent starting from the second groove portion 19, so that the operational stability of the gas discharge valve 10 can be further improved.

Further, it is preferable that the length $L_{D2}$ of the second groove portion 19 be set based on the outer diameter (major diameter) $D_P$ of the protruding portion 14. For example, the ratio ($L_{D2}/D_P$) of the length $L_{D2}$ of the second groove portion to the major axis $D_P$ of the protruding portion is preferably 60% to 95%, and more preferably 70% to 90%. As the $L_{D2}/D_P$ increases, when the internal pressure of the case suddenly rises, the protruding portion 14 tends to bend easily starting from the second groove portion 19. Meanwhile, as the $L_{D2}/D_P$ becomes smaller, the increase in the processing load due to the formation of the second groove portion 19 is suppressed, so that the protruding portion 14 tends to be easily molded. Further, from the viewpoint of suppressing an increase in the processing load due to the formation of the second groove portion 19, it is preferable that the depth of the central portion 19a of the second groove portion 19 in the length direction of the second groove portion 19 (depth direction Y in FIG. 4) be set larger than the depth of both end portions 19b. Further, it is more preferable that the second groove portion 19 be formed so as to be continuously deepened from both end portions 19b in the length direction toward the central portion 19a. This makes it possible to particularly advantageously suppress an increase in the processing load due to the formation of the second groove portion 19.

(3) Thin-Walled Portion

The thin-walled portion 16 is an annular region formed around the protruding portion 14. As shown in FIG. 2, the thickness $T_T$ of the thin-walled portion 16 is smaller than the thickness $T_P$ of the protruding portion 14. The gas discharge valve 10 of the sealing plate 1 according to the present embodiment discharges the gas generated inside the battery case to the outside as a result of the thin-walled portion 16 being broken when a large amount of gas is suddenly generated. It is preferable that the thickness $T_T$ of the thin-walled portion 16 be designed so that the thin-walled portion be stably broken when a problem such as overcharging occurs in consideration of the volume of the battery case of the secondary battery and the usage environment. As an example, the ratio ($T_T/T_B$) of the thickness $T_T$ of the thin-walled portion 16 to the thickness $T_B$ of the base portion 12 is preferably 1% to 30%, and more preferably 5% to 20%. This makes it possible to construct a gas discharge valve 10 in which the thin-walled portion 16 breaks and opens at a desired pressure. Specifically, as the $T_T/T_B$ becomes smaller, the thin-walled portion 16 is more likely to break, so that the reactivity of the gas discharge valve 10 with respect to the increase in the internal pressure of the case is improved. Meanwhile, as the $T_T/T_B$ increases, the strength of the thin-walled portion 16 improves, so that the malfunction of the gas discharge valve 10 can be prevented. Further, the first surface 16a of the thin-walled portion 16 in the present embodiment is formed to be on a substantially the same surface as the first surface 12a of the base portion 12. As "substantially the same surface", the first surface 16a of the thin-walled portion 16 can be within ±5 mm of the first surface 12a of the base portion 12 in a direction perpendicular to the first surface 12a of the base portion 12 (height direction Z in FIG. 2). Further, it is more preferable that the first surface 16a of the thin-walled portion 16 be within ±1 mm of the first surface 12a of the base portion 12 in the direction perpendicular to the first surface 12a of the base portion 12. It is even more preferable that the first surface 16a of the thin-walled portion 16 be on the same surface as the first surface 12a of the base portion 12. The thin-walled portion 16 having the first surface 16a formed on substantially the same surface as the first surface 12a of the base portion 12 is molded by unidirectionally crushing a second surface Wa of the metal member W toward a first surface Wb (see FIG. 5). As a result, the processing load and work hardening due to plastic deformation can be reduced as compared with the case where the metal member is crushed from both sides.

The thin-walled portion 16 in the present embodiment is provided with a substantially annular first groove portion 17 that surrounds the protruding portion 14. Since the portion where the first groove portion 17 is formed is a fragile portion having a particularly low strength in the thin-walled portion 16, it becomes a starting point at which the thin-walled portion 16 breaks when the internal pressure of the case suddenly rises. In other words, by providing the first groove portion 17 in the thin-walled portion 16, the break start position when the gas discharge valve 10 operates can be easily controlled. As a result, it becomes easy to design a gas discharge valve 10 that operates stably at a desired pressure. For example, the ratio of the depth of the first groove portion 17 to the thickness of the thin-walled portion 16 is preferably 5% to 60%, and more preferably 10% to 50%. As the depth of the first groove portion 17 with respect to the thickness of the thin-walled portion 16 increases, the thin-walled portion 16 is more likely to break starting from the first groove portion 17, so that the operational stability of the gas discharge valve 10 tends to improve. Meanwhile, the strength of the thin-walled portion 16 increases as the depth of the first groove portion 17 with respect to the thickness of the thin-walled portion 16 decreases. As a result, it is possible to prevent the thin-walled portion 16 from being damaged during molding of the first groove portion 17, and it is also possible to prevent the gas discharge valve 10 from malfunctioning. The substantially annular first groove portion 17 is inclusive of not only a perfectly annular groove portion but also of an annular groove portion in which a part thereof is missing. For example, when the peripheral length of the perfect annular groove portion is taken as 100%, the peripheral length of the substantially annular first groove portion 17 is preferably 80% or more, more preferably 90% or more, and still more preferably 95% or more. Further, the first groove portion 17 may be a perfect ring.

Further, as described above, when the sealing plate 1 according to the present embodiment is used for a secondary battery, the first surface side of the gas discharge valve 10 is arranged inside the case (the positive pressure side when the internal pressure of the case rises). Therefore, it is preferable that the first groove portion 17 be formed on the second surface 16b arranged outside the case. As a result, when a large amount of gas is suddenly generated and the first surface 16a of the thin-walled portion 16 is pressurized toward the second direction (upward in the height direction Z in FIG. 2), the thin-walled portion 16 can be broken so as to expand the first groove portion 17. As a result, the operational stability of the gas discharge valve 10 can be further improved.

(4) Recess

Further, in the present embodiment, a recess 18 dented from the second surface 12b of the base portion 12 is provided on the second surface (upper surface in FIG. 2) of the thin-walled portion 16 and the protruding portion 14. The recess 18 is a dent having a substantially perfect circular planar shape. In other words, the recess 18 formed on the upper side of the gas discharge valve 10 is a space surrounded by an annular peripheral wall 18a that rises substantially vertically from the outer edge of the annular thin-walled portion 16. The bottom surface 18c of the recess 18 includes the thin-walled portion 16 having a relatively small thickness and the protruding portion 14 that is thicker than the thin-walled portion 16.

In the present embodiment, a tapered portion 18b is provided on the peripheral wall 18a of the recess 18. Specifically, a tapered portion 18b, which is a slope with a height decreasing from the outer side to the inner side in the radial direction, is formed at the upper end of the peripheral wall 18a of the recess 18. When the gas discharge valve 10 is opened, the protruding portion 14 connected to the base portion 12 via a part of the thin-walled portion 16 stays in the space in the second direction of the opening, and can hinder the escape of gas from the inside of the battery case. Meanwhile, where the tapered portion 18b is formed on the peripheral wall 18a of the recess 18, the range of motion of the protruding portion 14 when the gas discharge valve 10 is opened can be sufficiently ensured. As a result, the protruding portion 14 can be prevented from coming into contact with the peripheral wall 18a of the recess 18 and staying in a space in the second direction of the opening, and a sufficient amount of gas discharged when the gas discharge valve 10 is opened can be ensured. In FIG. 2, the tapered portion 18b is formed only on the upper end of the peripheral wall 18a of the recess 18. However, from the viewpoint of suppressing deterioration of gas release, the region where the tapered portion is formed is not particularly limited. For example, a tapered portion that is inclined so that the height decreases from the outer side to the inner side in the radial direction may be formed on the entire peripheral wall of the recess.

Further, in the gas discharge valve 10 of the present embodiment, an annular step 18d is provided on the bottom surface 18c of the recess 18, and the region outside the annular step 18d is higher than the inner region. Specifically, the annular step 18d is provided on the second surface 14b of the protruding portion 14 located on the inner side of the thin-walled portion 16. As a result, the thickness at the boundary between the thin-walled portion 16 and the protruding portion 14 can be ensured to some extent, so that the boundary between the thin-walled portion 16 and the protruding portion 14 can be prevented from being broken during the press working.

Molding of Gas Discharge Valve

Figure 5:
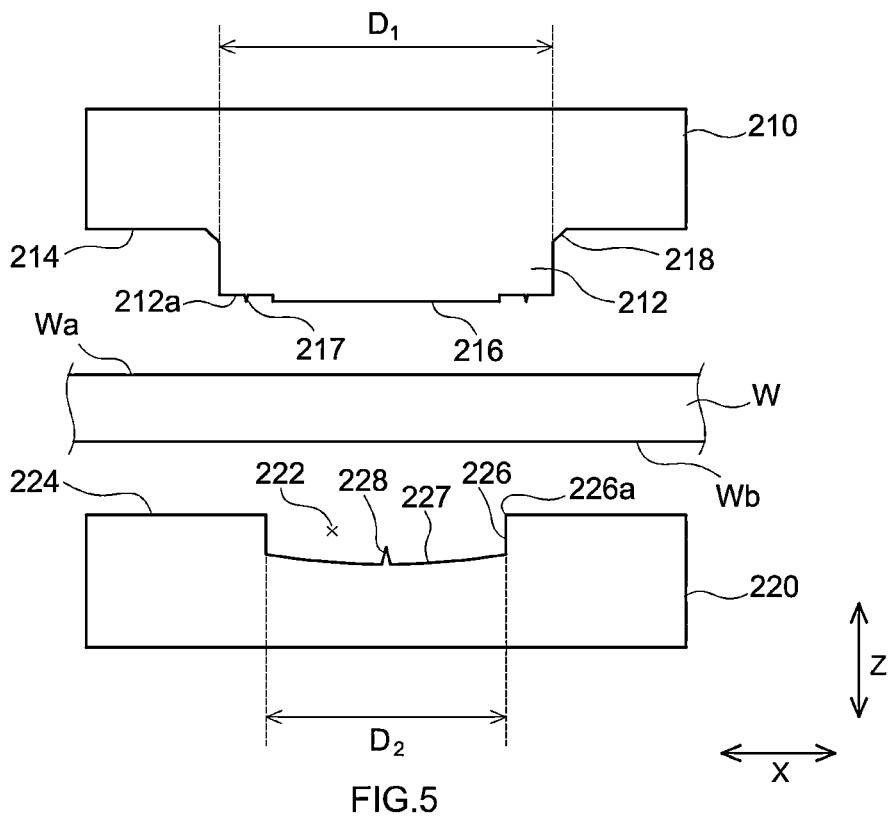
FIG. 5 is a cross-sectional view illustrating the molding of the gas discharge valve in the sealing plate according to the embodiment.
Figure 6:
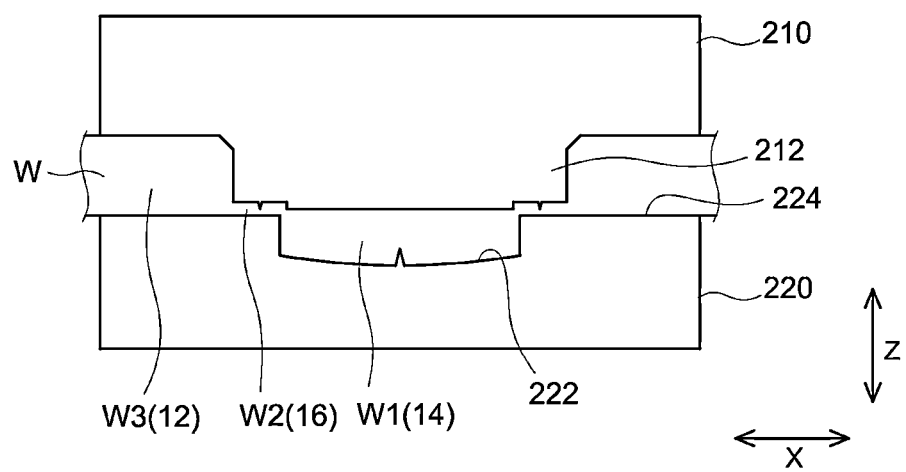
FIG. 6 is a cross-sectional view illustrating the molding of a gas discharge valve in the sealing plate according to the embodiment.

Next, a procedure for molding the gas discharge valve 10 having the above configuration in the sealing plate 1 will be described. FIGS. 5 and 6 are cross-sectional views illustrating a procedure for molding a gas discharge valve in the sealing plate according to the present embodiment.

As shown in FIG. 5, when molding the gas discharge valve 10 in the present embodiment, first, a flat plate-shaped metal member W is prepared and arranged between the pair of pressing jigs 210 and 220. Hereinafter, for convenience of explanation, the pressing jig 210 that presses the second surface (upper surface in FIG. 5) Wa of the metal member W is referred to as a "first pressing jig 210", and the pressing jig 220 that presses the first surface (lower surface in FIG. 5) Wb of the metal member W is referred to as a "second pressing jig 220". The first pressing jig 210 is formed with a columnar projecting portion 212 protruding from a reference surface 214 in the first direction (lower side in FIG. 5). Meanwhile, the second pressing jig 220 is formed with a columnar recess 222 dented from a reference surface 224 toward the first direction. Here, when molding the gas discharge valve 10 having the above configuration, the diameter $D_1$ of the projecting portion 212 of the first pressing jig 210 is made larger than the diameter $D_2$ of the recess 222 of the second pressing jig 220. The first pressing jig 210 and the second pressing jig 220 shown here are configured to perform processing integrated into one process, but the two jigs may be divided into separate jigs to perform processing as separate processes.

Then, as shown in FIG. 6, the metal member W is sandwiched between the first pressing jig 210 and the second pressing jig 220 to perform press working. At this time, the central portion W1 of the metal member W is pressed by the projecting portion 212 of the first pressing jig 210 and plastically deformed so as to enter the recess 222 of the second pressing jig 220. As a result, the protruding portion 14 protruding from the first surface 12a of the base portion 12 toward the first direction is formed. At this time, since the diameter $D_1$ of the projecting portion 212 of the first pressing jig 210 is larger than the diameter $D_2$ of the recess 222 of the second pressing jig 220, the region W2 around the central portion W1 of the metal member W is sandwiched between the projecting portion 212 of the first pressing jig 210 and the reference surface 224 of the second pressing jig 220. As a result, the thin-walled portion 16 having a thickness smaller than that of the protruding portion 14 is molded around the protruding portion 14. Further, an outer peripheral edge portion W3 of the metal member W is sandwiched between the reference surface 214 of the first pressing jig 210 and the reference surface 224 of the second pressing jig 220. As a result, a base portion 12 thicker than the thin-walled portion 16 is molded around the thin-walled portion 16.

Here, in the molding of the thin-walled portion 16 in the above-mentioned press working, the metal present in the region W2 around the central portion W1 of the metal member W is thinly crushed by the projecting portion 212 of the first pressing jig 210 and the reference surface 224 of the second pressing jig 220. At this time, in the present embodiment, the metal obtained by crushing the region W2 around the central portion W1 can be released to the protruding portion 14 molded in the recess 220. Further, in the present embodiment, the total amount of metal that is plastically deformed is smaller than that in the related art in which the entire bottom surface of the recess is thinly crushed to form a thin-film portion. By these actions, resistance (processing load) during press working is reduced, so that the occurrence of defective products can be suppressed and mass production stability can be improved. Further, as a result of reducing the total amount of metal that is plastically deformed, work hardening of the thin-walled portion 16 after molding is also reduced, so that the degree of freedom of designing the thickness $T_T$ (see FIG. 2) of the thin-walled portion 16 is also improved.

In the present embodiment, an annular protrusion 217 along the outer peripheral edge of the columnar projecting portion 212 is formed on a first surface 212a of the projecting portion 212 of the first pressing jig 210. The annular first groove portion 17 is thereby formed on the second surface 16b of the thin-walled portion 16 after molding. As a result, it is possible to mold the gas discharge valve 10 having excellent operational stability in which the thin-walled portion 16 breaks starting from the first groove portion 17. Further, between the reference surface 214 and the projecting portion 212 of the first pressing jig 210, a slope 218 inclined so as to descend from the reference surface 214 toward the projecting portion 212 is formed. The tapered portion 18b is thereby formed at the upper end of the peripheral wall 18a of the recess 18 after molding. As a result, it is possible to prevent the protruding portion 14 of the opened gas discharge valve 10 from interfering with the peripheral wall 18a of the recess 18 and staying on the gas flow path.

Further, a disk-shaped projecting portion 216 further protruding in the first direction from the first surface 212a of the projecting portion 212 is formed at the central portion of the first surface 212a of the projecting portion 212 of the first pressing jig 210. As a result, the annular step 18d is formed on the bottom surface 18c of the recess 18 after molding, and the region outside the annular step 18d (the second surface 16b of the thin-walled portion 16) can be made higher than the inner region (the second surface 14b of the protruding portion 14). As a result, it is possible to prevent the thin-walled portion 16 from breaking at a position sandwiched between the projecting portion 212 of the first pressing jig 210 and the upper end 226a of the peripheral wall 226 of the recess 222 of the second pressing jig 220.

Meanwhile, at the central portion of the bottom surface 227 of the recess 222 of the second pressing jig 220, a protrusion 228 having a linear planar shape protrudes in the second direction. A linear second groove portion 19 is thereby formed on the first surface of the protruding portion 14 after molding. As a result, when the internal pressure of the case suddenly rises, the protruding portion 14 bends along the second groove portion 19, and a large stress can be applied to the thin-walled portion 16. Further, the bottom surface 227 of the recess 222 of the second pressing jig 220 is curved so that the central portion in the radial direction becomes deeper than the peripheral portion. The protruding portion 14 can thereby be formed so that the center of the first surface 14a protrudes in the first direction. As a result, in the molding of the protruding portion 14, plastic deformation occurs so that metal gathers toward the central portion of the bottom surface 227 of the recess 222, so that it becomes easy to release the metal crushed between the projecting portion 212 of the first pressing jig 210 and the reference surface 224 of the second pressing jig 220 to the recess 222.

Secondary Battery

Figure 7:
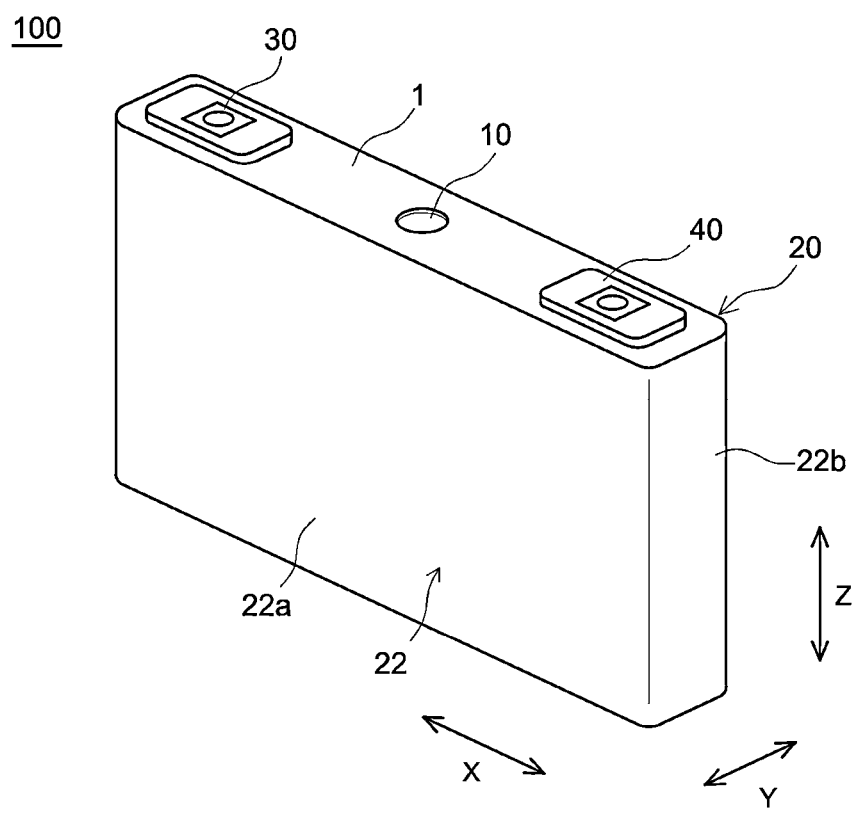
FIG. 7 is a perspective view schematically showing a secondary battery according to an embodiment.
Figure 8:
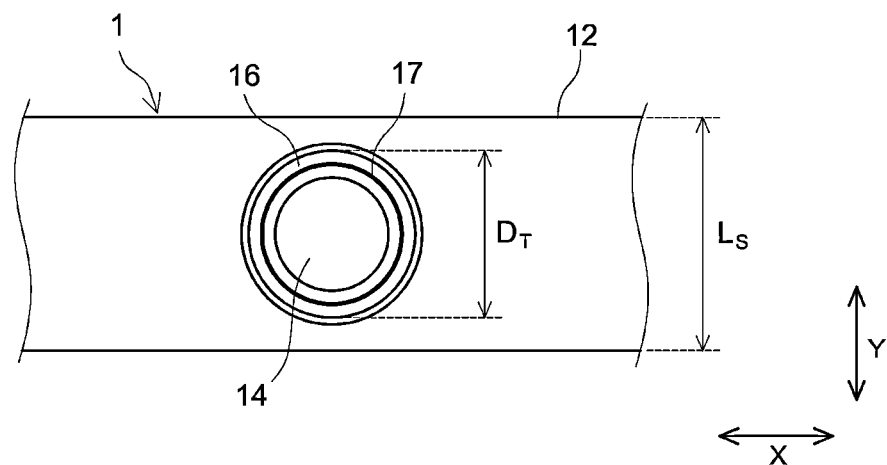
FIG. 8 is a plan view schematically showing a second surface of the sealing plate of the secondary battery according to the embodiment.

The sealing plate 1 having the above configuration is a secondary battery component that constitutes one of the side walls of a battery case of a secondary battery. Hereinafter, a secondary battery using the sealing plate 1 having the above configuration will be described. FIG. 7 is a perspective view schematically showing a secondary battery according to the present embodiment. FIG. 8 is a plan view schematically showing the outer surface of the case of the sealing plate of the secondary battery according to the present embodiment.

A secondary battery 100 shown in FIG. 7 includes an electrode body (not shown) and a battery case 20 that accommodates the electrode body. Although detailed illustration is omitted, the electrode body has a positive electrode, a negative electrode, and a separator. For example, the electrode body may be a wound electrode body obtained by laminating a band-shaped positive electrode and a band-shaped negative electrode with two band-shaped separators interposed therebetween and winding the laminate around a winding axis. Further, another example of the structure of the electrode body is a laminated electrode body in which a plurality of angular (typically rectangular) positive electrodes and a plurality of angular (typically rectangular) negative electrodes are stacked in an insulated state. The material and structure of each member (positive electrode, negative electrode, separator, and the like) constituting the electrode body can be those that can be adopted in a general secondary battery (for example, a lithium ion secondary battery) without particular limitation, and since the technique disclosed herein is not limited thereby, detailed description thereof will be omitted. Although not shown, the battery case 20 also accommodates an electrolytic solution. For the electrolytic solution, those that can be adopted in a general secondary battery can be used without particular limitation.

The battery case 20 is a housing that accommodates the electrode body. The material of the battery case 20 may be the same as that conventionally used, and is not particularly limited. For example, the battery case 20 is preferably made of metal having a predetermined strength. Examples of the material of the battery case 20 include aluminum, aluminum alloy, iron, iron alloy, and the like.

As shown in FIG. 7, the battery case 20 has a flat and bottomed rectangular parallelepiped outer shape (angular shape). The battery case 20 includes an exterior body 22 having an opening on the upper surface and a sealing plate 1 that closes the opening of the exterior body 22. The exterior body 22 is a box-shaped member including a bottom wall having a rectangular planar shape (not shown), a pair of long side walls 22a extending from the long side of the rectangular bottom wall along the height direction Z and facing each other, and a pair of short side walls 22b extending from the short sides of the rectangular bottom wall along the height direction Z and facing each other. A substantially rectangular opening (not shown) surrounded by the upper side of each of the pair of long side walls 22a and the pair of short side walls 22b is formed on the upper surface of the exterior body 22. The sealing plate 1 having the gas discharge valve 10 having the above-described configuration is attached to the exterior body 22 so as to close the opening on the upper surface of the exterior body 22, and faces the bottom wall of the exterior body 22. By joining (for example, welding) the peripheral edge of the opening of the exterior body 22 and the outer peripheral edge of the sealing plate 1, the battery case 20 is constructed in which the inside is sealed (hermetically closed). For joining the sealing plate 1, for example, laser welding or the like can be used.

Further, a positive electrode terminal 30 and a negative electrode terminal 40 are attached to the sealing plate 1 of the secondary battery 100. The positive electrode terminal 30 is a long conductive member extending along the height direction Z. The lower end of the positive electrode terminal 30 is connected to the positive electrode of the electrode body inside the battery case 20. Meanwhile, the upper end of the positive electrode terminal 30 is exposed to the outside of the battery case 20. Further, the negative electrode terminal 40 also has a structure substantially equivalent to that of the positive electrode terminal 30. That is, the lower end of the negative electrode terminal 40 is connected to the negative electrode inside the battery case 20, and the upper end is exposed to the outside of the battery case 20. The positive electrode terminal and the negative electrode terminal may be provided on the side wall (side wall of the exterior body) of the battery case other than the sealing plate.

The gas discharge valve 10 is provided on the sealing plate 1 having the above configuration. At this time, the sealing plate 1 is arranged so that the first surface of the gas discharge valve 10 faces the electrode body. In other words, in the secondary battery 100 according to the present embodiment, the sealing plate 1 is attached to the exterior body 22 so that the protruding portion 14 of the gas discharge valve 10 projects toward the electrode body inside the battery case 20. The annular thin-walled portion 16 having a thickness smaller than the thickness $T_P$ of the protruding portion 14 is provided around the protruding portion 14. Further, the first surface 16a (the surface on the electrode body side) of the thin-walled portion 16 is present on substantially the same surface as the inner surface of the sealing plate 1.

Since the sealing plate 1 having the above configuration is equipped with the gas discharge valve having excellent mass production stability and freedom of design, a highly reliable secondary battery 100 in which suddenly generated gas can be stably discharged can be easily designed and mass-produced. Further, since the protruding portion 14 protrudes toward the electrode body side where the pressure becomes positive when the internal pressure of the case rises, the stress when the internal pressure rises can be concentrated on the thin-walled portion 16. This can also contribute to improving the operational stability of the gas discharge valve 10.

When the planar shape of the sealing plate 1 is substantially rectangular as in the present embodiment, the ratio ($D_T/L_S$) of the outer diameter $D_T$ of the thin-walled portion 16 to the length $L_S$ of the sealing plate 1 in the lateral direction (depth direction Y in FIG. 8) of the substantially rectangular sealing plate 1 is preferably 30% to 70%. When a large amount of gas is suddenly generated inside the secondary battery 100 and the rectangular sealing plate 1 is deformed, the sealing plate 1 bends so that a ridge line is formed along the lateral direction (depth direction Y) of the sealing plate 1. At this time, where a thin-walled portion 16 having an outer diameter of a predetermined length is formed in the lateral direction of the first wall, a large stress can be concentrated near both ends of the thin-walled portion 16 in the lateral direction of the first wall. As a result, the thin-walled portion 16 is easily broken at the desired position when the internal pressure of the case rises, so that the secondary battery 100 having high reproducibility during operation can be constructed.

Other Embodiments

The embodiment of the technique disclosed here has been described above. The technique disclosed herein is not limited to the above-described embodiment, and is inclusive of various embodiments. Hereinafter, other embodiments of the sealing plate disclosed herein will be described.

Figure 9:
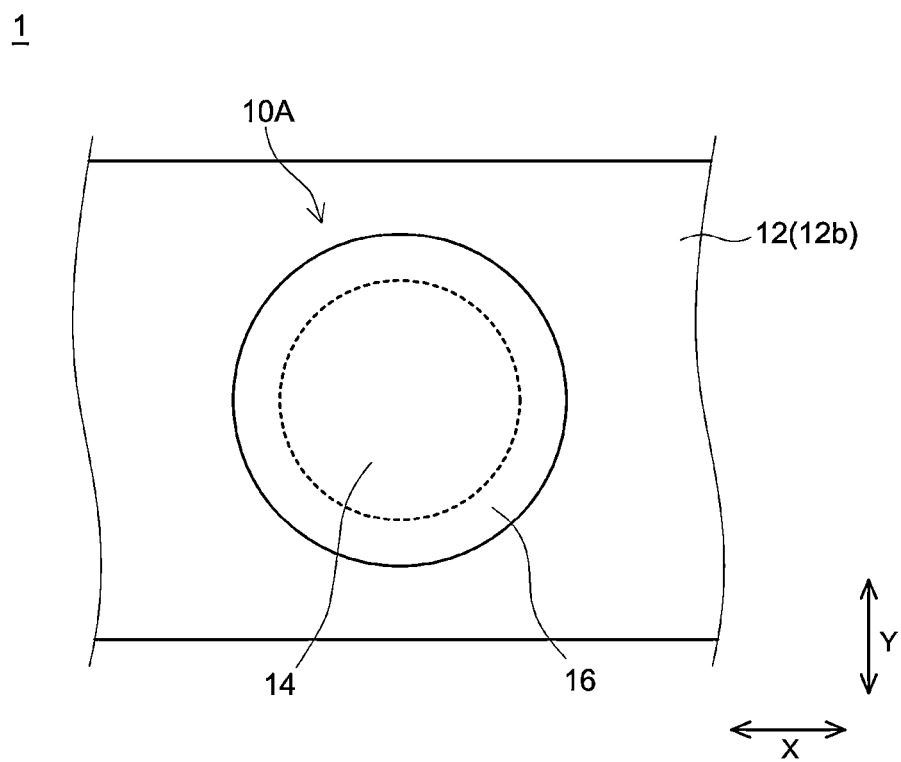
FIG. 9 is a plan view schematically showing a second surface of a gas discharge valve of a sealing plate according to another embodiment.
Figure 10:
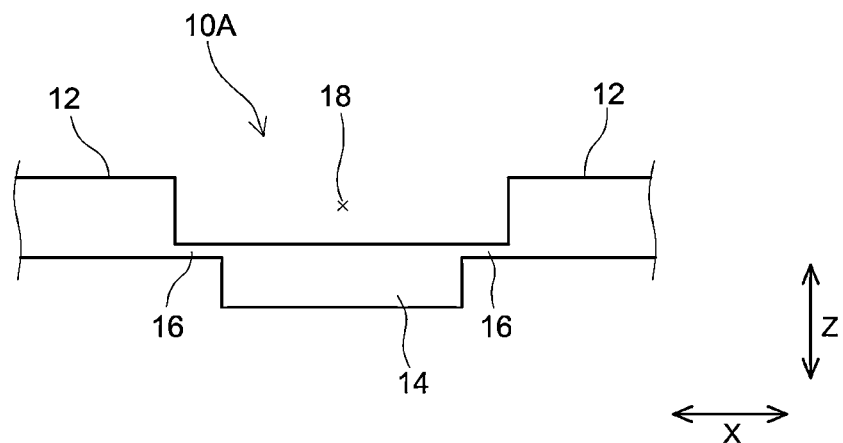
FIG. 10 is a cross-sectional view schematically showing the sealing plate according to another embodiment.

For example, as another embodiment of the sealing plate disclosed herein, the sealing plate 1 shown in FIGS. 9 and 10 can be mentioned. In a gas discharge valve 10A of the sealing plate 1, the first groove portion 17, the second groove portion 19, the tapered portion 18b and the step 18d formed in the above-described embodiment are not formed, and the first surface of the protruding portion 14 is also flat (see FIGS. 2 to 4). However, even with such a form, where the formation region of the thin-walled portion 16 is limited to the periphery of the protruding portion 14, the amount of plastic deformation of the metal in the molding of the gas discharge valve 10 can be reduced. Further, since the metal crushed during molding of the thin-walled portion 16 can be released to the protruding portion 14, the processing load during molding can be reduced and mass production stability can be improved. Furthermore, by reducing the amount of plastic deformation of the metal during molding, work hardening of the thin-walled portion 16 after molding is reduced, so that the degree of freedom of design can be improved. That is, even in the form shown in FIGS. 9 and 10, a configuration is realized in which the protruding portion 14 protruding from the first surface 12a of the base portion 12 in the first direction is provided, the annular thin-walled portion 16 having a thickness smaller than the thickness of the protruding portion 14 is provided around the protruding portion 14, and the first surface 16a of the thin-walled portion 16 is substantially on the same surface as the first surface 12a of the base portion 12, so that the sealing plate 1 equipped with the gas discharge valve 10A having excellent mass production stability and degree of freedom of design can be obtained.

Figure 11:
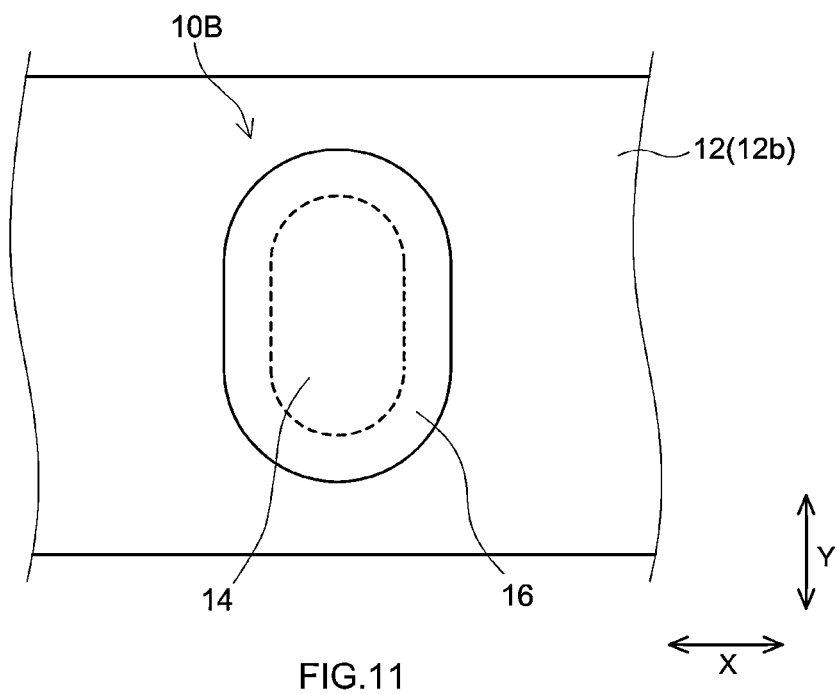
FIG. 11 is a plan view schematically showing a second surface in the vicinity of the gas discharge valve of the sealing plate according to another embodiment.
Figure 12:
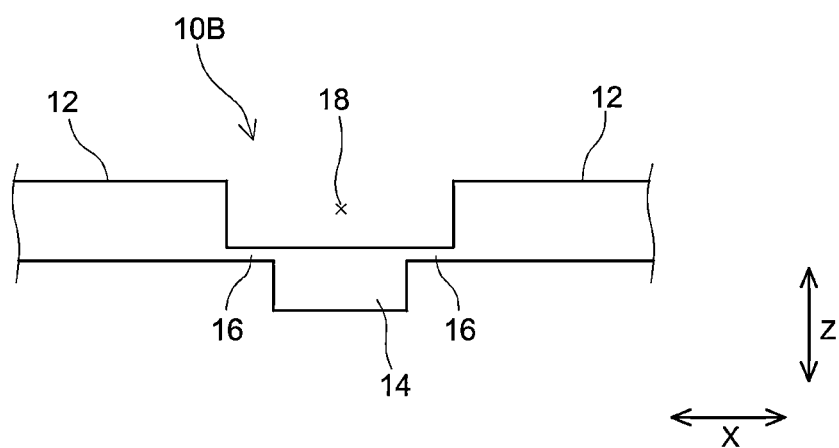
FIG. 12 is a cross-sectional view schematically showing a sealing plate according to another embodiment.

Further, in the gas discharge valves 10 and 10A in each of the above-described embodiments, the protruding portion 14 that is substantially circular in plan view is formed, and the annular thin-walled portion 16 having a substantially perfect circular outer edge is formed around the protruding portion 14. However, the shapes of the protruding portion 14 and the thin-walled portion 16 in plan view are not particularly limited, and various shapes can be adopted without particular limitation. For example, as shown in FIGS. 11 and 12, the gas discharge valve 10B may include the protruding portion 14 having an elliptical planar shape and the annular thin-walled portion 16 having an elliptical outer edge. With the gas discharge valve 10B in such a form, it is also possible to reduce the processing load and work hardening during molding and improve mass production stability and freedom of design. Although not shown, the planar shape of the protruding portion may be an angular shape (for example, a quadrangle, a pentagon, etc.). However, in consideration of operational stability of the gas discharge valve, mass production stability, and the like, the planar shape of the protruding portion 14 is preferably circular as shown in FIGS. 3, 9, and 11. Further, in each of the above-described embodiments, the shape of the outer edge of the protruding portion 14 in plan view and the shape of the outer edge of the thin-walled portion are substantially the same. However, the shape of the outer edge of the protruding portion and the shape of the outer edge of the thin-walled portion may be different. For example, a thin-walled portion having a substantially perfect circular outer edge may be formed around an angular protruding portion in plan view. In such a case, the effects of the techniques disclosed herein can also be fully exerted.

The embodiments of the technique disclosed herein have been described above. However, the above description is merely an example and does not limit the scope of claims. The technique described in the claims includes various changes and modifications of the specific examples illustrated in the above description.

What is claimed is:

1. A sealing plate for a secondary battery, the sealing plate comprising: a gas discharge valve, wherein
   the gas discharge valve has
      a flat plate-shaped base portion,
      a protruding portion protruding from a first surface of the base portion in a first direction,
      an annular thin-walled portion around the protruding portion, the thin-walled portion having a thickness smaller than a thickness of the protruding portion,
   a first surface of the thin-walled portion and the first surface of the base portion are substantially coplanar,
   the protruding portion has a first surface, which faces in the first direction and is curved,
   a center of the first surface of the protruding portion protrudes in the first direction,
   the thickness of the protruding portion gradually reduces in a radial direction of the protruding portion from the center of the first surface of the protruding portion to a periphery of the protruding portion.

2. The sealing plate according to claim 1, wherein the thickness of the protruding portion is equal to or less than a thickness of the base portion.

3. The sealing plate according to claim 2, wherein a ratio of the thickness of the protruding portion to the thickness of the base portion is 50% to 100%.

4. The sealing plate according to claim 1, wherein the thin-walled portion has a substantially annular first groove portion that surrounds the protruding portion.

5. The sealing plate according to claim 4, wherein the first groove portion is formed on a second surface of the thin-walled portion opposite to the first surface of the thin-walled portion.

6. The sealing plate according to claim 4, wherein a ratio of a depth of the first groove portion to the thickness of the thin-walled portion is 10% to 50%.

7. The sealing plate according to claim 1, wherein a ratio of the thickness of the thin-walled portion to a thickness of the base portion is 5% to 20%.

8. The sealing plate according to claim 1, wherein a shape of the protruding portion in plan view is a circular shape in which a ratio of a major axis to a minor axis is 90% to 100%.

9. The sealing plate according to claim 1, wherein the first surface of the protruding portion includes a second groove portion having a linear shape in plan view.

10. The sealing plate according to claim 9, wherein
    a shape of the protruding portion in plan view is a circular shape in which a ratio of a major axis to a minor axis is 90% to 100%, and
    a ratio of a length of the second groove portion to the major axis of the protruding portion is 70% to 90%.

11. The sealing plate according to claim 9, wherein
    the second groove portion has, in a length direction of the second groove portion, a central portion and two end portions, and
    a depth of the central portion of the second groove portion is larger than a depth of the two end portions of the second groove portion.

12. The sealing plate according to claim 9, wherein the second groove portion extends along a lateral direction of the sealing plate.

13. The sealing plate according to claim 1, wherein
    the thin-walled portion and a second surface of the protruding portion include a recess dented from a second surface of the base portion, and
    a peripheral wall of the recess includes a tapered portion.

14. The sealing plate according to claim 13, wherein
    an annular step is on a bottom surface of the recess, and
    a region on an outer side of the annular step is higher than an inner region on an inner side of the annular step.

15. The sealing plate according to claim 14, wherein the annular step is on the second surface of the protruding portion on an inner side of the thin-walled portion.

16. The sealing plate according to claim 1, wherein a ratio of an outer diameter of the thin-walled portion in a lateral direction of the sealing plate to a length of the sealing plate in the lateral direction of the sealing plate is 30% to 70%.

17. A secondary battery, comprising:
    an electrode body including a positive electrode and a negative electrode, and
    a battery case that accommodates the electrode body, wherein
    the battery case includes:
       an exterior body with an opening on one side, and
       a sealing plate that closes the opening of the exterior body,
    the sealing plate includes a gas discharge valve,
    the gas discharge valve has
       a flat plate-shaped base portion,
       a protruding portion protruding from a first surface of the base portion in a first direction,
       an annular thin-walled portion around the protruding portion, the thin-walled portion having a thickness smaller than a thickness of the protruding portion,
    a first surface of the thin-walled portion and the first surface of the base portion are substantially coplanar,
    the protruding portion of the gas discharge valve protrudes toward the electrode body, the protruding portion has a first surface, which faces in the first direction and is curved, a center of the first surface of the protruding portion protrudes in the first direction toward the electrode body,
    the thickness of the protruding portion gradually reduces in a radial direction of the protruding portion from the center of the first surface of the protruding portion to a periphery of the protruding portion.

18. The sealing plate according to claim 4, wherein
    the first groove portion surrounds the protruding portion and defines an inner circumferential region, and
    an entirety of the inner circumferential region is lower than a second surface of the base portion opposite to the first surface of the base portion.

* * * * *